US012680858B2

(12) United States Patent
Kuhnen et al.

(10) Patent No.: US 12,680,858 B2
(45) Date of Patent: Jul. 14, 2026

(54) SENSOR DEVICE AND METHOD FOR DETERMINING AND/OR MONITORING A PROCESS VARIABLE OF A MEDIUM IN A CONTAINER

(71) Applicants:Endress+Hauser SE+Co. KG, Maulburg (DE); Universität Basel, Basel (CH)

(72) Inventors: Raphael Kuhnen, Schliengen (DE); Mohammad Sadegh Ebrahimi, Lörrach (DE); Johannes Kölbl, Basel (CH)

(73) Assignee: Endress+Hauser SE+Co. KG, Maulburg (DE)

( * ) Notice: Subject to any disclaimer, the term of this patent is extended or adjusted under 35 U.S.C. 154(b) by 207 days.

(21) Appl. No.: 18/260,077

(22) PCT Filed: Dec. 16, 2021

(86) PCT No.: PCT/EP2021/086272
§ 371 (c)(1),
(2) Date: Jun. 30, 2023

(87) PCT Pub. No.: WO2022/148633
PCT Pub. Date: Jul. 14, 2022

(65) Prior Publication Data
US 2024/0060812 A1 Feb. 22, 2024

(30) Foreign Application Priority Data
Jan. 8, 2021 (DE) ..................... 10 2021 100 223.0

(51) Int. Cl.
*G01F 23/292* (2006.01)

(52) U.S. Cl.
CPC ................................. *G01F 23/2922* (2013.01)

(58) Field of Classification Search
None
See application file for complete search history.

(56) References Cited

U.S. PATENT DOCUMENTS

| | | | |
|---|---|---|---|
| 2012/0019242 A1 | 1/2012 | Hollenberg et al. | |
| 2014/0035584 A1 | 2/2014 | Twitchen et al. | |
| (Continued) | | | |

FOREIGN PATENT DOCUMENTS

| | | | |
|---|---|---|---|
| CN | 102879052 A1 | 1/2013 | |
| CN | 107438775 A1 | 12/2017 | |
| (Continued) | | | |

OTHER PUBLICATIONS

English Translation of DE102017205099 (Year: 2018).*

*Primary Examiner* — Mark A Shabman
(74) *Attorney, Agent, or Firm* — Christopher R. Powers; Endress+Hauser (USA) Holding, Inc.

(57) ABSTRACT

A sensor device for determining and/or monitoring a process variable of a medium in a container includes: a crystal body having at least one defect; and a magnetic field device for generating a magnetic field, the magnetic field device arranged such that a magnetic field can be generated in the region of the crystal body and in the region of the medium located within the container, so that a change of the magnetic field in the region of the crystal body is amplified, wherein the crystal body and the magnetic field device are arranged from the outside on a wall of the container. A method for determining and/or monitoring a process variable of a medium in a container using the sensor device is also disclosed.

7 Claims, 3 Drawing Sheets

(56)     References Cited

U.S. PATENT DOCUMENTS

Figures 1, 2:
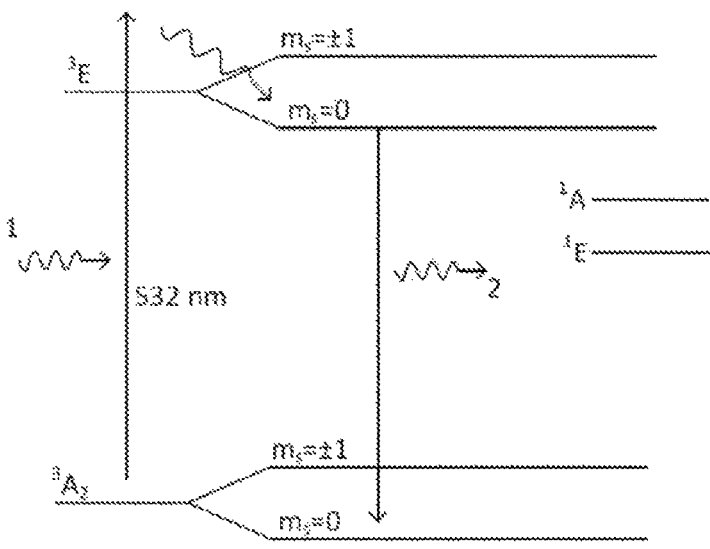

| | | | |
|---|---|---|---|
| 2017/0227394 A1* | 8/2017 | Bhutani | ............... G01F 23/2924 |
| 2018/0017679 A1 | 1/2018 | Valouch et al. | |
| 2020/0096377 A1* | 3/2020 | Agarwal | ................. G01F 23/26 |

FOREIGN PATENT DOCUMENTS

| | | | | |
|---|---|---|---|---|
| CN | 111679098 | A | 9/2020 | |
| DE | 3341265 | A1 | 5/1985 | |
| DE | 3726411 | A1 | 2/1989 | |
| DE | 19936574 | A1 | 2/2001 | |
| DE | 102014219547 | A1 | 3/2016 | |
| DE | 102016221065 | A1 | 4/2018 | |
| DE | 102017205099 | A1 * | 9/2018 | ........... G01R 33/032 |
| DE | 102017206279 | A1 | 10/2018 | |
| DE | 102018214617 | A1 | 3/2020 | |
| DE | 102019203930 | A1 | 9/2020 | |
| DE | 102020129349 | A1 | 5/2021 | |
| DE | 102019220348 | A1 | 6/2021 | |
| DE | 102020123993 | A1 | 3/2022 | |
| WO | 2016045888 | A1 | 3/2016 | |
| WO | 2017211504 | A1 | 12/2017 | |
| WO | 2020047006 | A1 | 3/2020 | |
| WO | 2020060694 | A1 | 3/2020 | |

* cited by examiner

SENSOR DEVICE AND METHOD FOR DETERMINING AND/OR MONITORING A PROCESS VARIABLE OF A MEDIUM IN A CONTAINER

The invention relates to a sensor device for determining and/or monitoring a process variable of a medium in a container and to a corresponding method.

Field devices for monitoring and/or determining at least one, for example, chemical or physical, process variable of a medium are known from the prior art in a wide variety of embodiments. In the context of the present application, all measuring devices that are used close to the process and that supply or process process-relevant information, i.e., also remote I/Os, radio adapters or generally electronic components that are arranged on the field level, will in principle be referred to as field devices. The companies of the Endress+ Hauser Group produce and distribute a large variety of such field devices.

A newer development in the field of sensor technology is represented by so-called quantum sensors, in which a wide variety of quantum effects are utilized for determining various physical and/or chemical measured variables. For example, such approaches are of particular interest in the field of industrial process automation with regard to increasing efforts towards miniaturization with a simultaneous increase in the performance of the respective sensors.

From the unpublished patent application DE 10 2020 123 993, a sensor device has become known which is based on a crystal body with at least one defect and uses the fluorescence signal of the crystal body for determining and/or monitoring a process variable of a medium. It is further disclosed to determine a characteristic quantity for the magnetic field, such as, for example, the magnetic permeability or magnetic susceptibility, and to carry out a condition monitoring of a process taking place in the container on the basis of this determined characteristic quantity. For the determination of a limit level, for example, a limit value for the characteristic variable for the magnetic field is predetermined.

It is therefore the task of the present invention to provide a sensor device and a method which makes a process variable of a medium accessible in a simple manner.

With regard to the sensor device, the task is solved according to the invention by a sensor device for determining and/or monitoring a process variable of a medium in a container, comprising:

a crystal body with at least one defect, a magnetic field device for generating a magnetic field, the magnetic field device being arranged in such a way that a magnetic field can be generated by means of the magnetic field device in the region of the crystal body and in the region of the medium located inside the container, so that a change in the magnetic field in the region of the crystal body is amplified, the crystal body and the magnetic field device being able to be arranged from the outside on a wall of the container, an excitation unit for optical excitation of the at least one defect, a detection unit for detecting a magnetic field-dependent fluorescence signal of the crystal body, an evaluation unit for determining at least one statement about the process variable on the basis of the fluorescence signal.

The at least one defect in the crystal body is optically excited with the aid of the excitation unit and the resulting fluorescence signal is detected and evaluated. The fluorescence signal of the crystal body can be influenced by magnetic fields in the area of the crystal body. Thus, a change in the magnetic field due to the medium, such as a change in the gradient of the magnetic field, will affect the fluorescence signal. For example, a change in magnetic permeability due to a change in the medium may result in a change in the gradient of the magnetic field. However, due to the small differences in the magnetic permeabilities of different media, the changes in the magnetic field are usually very small, making the effect on the fluorescence signal difficult to measure. Therefore, a magnetic field device is additionally arranged to amplify a change of the magnetic field in the area of the crystal body. Thus, the change in the gradient of the magnetic field can be read out with the aid of the fluorescence signal and subsequently the process variable can be determined and/or monitored on the basis of the fluorescence signal without the need to determine a magnetic permeability or a magnetic susceptibility. The sensor device according to the invention thus allows a very high measurement accuracy and measurement resolution of media-related changes in the magnetic field.

The sensor device is further designed as a device that is flush with the wall of the container or as a non-invasive device that is located completely outside the container. The excitation unit may, for example, comprise a laser or a light-emitting diode (LED). The detection unit may be, for example, a photodetector or a CMOS sensor. The sensor device may comprise further optical elements, such as lenses, mirrors or filters.

In accordance with one embodiment, the crystal body is a diamond having at least one nitrogen defect, silicon carbide having at least one silicon defect, or hexagonal boron nitride having at least one defect color center.

According to the invention, the crystal body comprises at least one defect. However, several defect sites may also be used. In this case, a linear arrangement of the defects is particularly preferred. Several defects lead to an increased intensity, so that the measurement resolution is improved and changes in intensity can be detected even with comparatively weak changes in magnetic fields.

In a further embodiment, the magnetic field device has a permanent magnet or a coil. The crystal body can be arranged at least partially inside the coil.

In accordance with a further embodiment, at least two defects and/or at least two crystal bodies with at least one defect each can be arranged linearly and perpendicularly to the base on the wall of the container. The at least two defects and/or the at least two crystal bodies are arranged in such a way that a direction of the change of the magnetic field can be determined. In this way, a vectorial orientation of the magnetic field can be determined.

Advantageously, at least one optical fiber is provided for conducting the excitation signal from the excitation unit to the crystal body and/or for conducting the fluorescence signal of the crystal body to the detection unit.

Preferably, the sensor device is arrangeable outside the container. Non-invasive devices are preferred over invasive devices in process automation for various reasons, such as hygiene and/or tightness requirements. In a non-invasive sensor device, the wall of the container between the medium and the sensor device reduces the sensitivity of the at least one defect to the change of the magnetic field, so that the arrangement of the magnetic field device to amplify the change of the magnetic field plays a decisive role. Without the magnetic field device, the determination and/or monitoring of the process variable would not be possible in the case of a non-invasive sensor device.

In a further embodiment, the process variable is a filling level and/or a limit level of the medium in the container. When determining the filling level or the limit level of the medium, a change in the magnetic permeability occurs due to the different magnetic permeabilities of medium and air at the interface between the medium and the air above it. The change in magnetic permeability in turn produces a change in the gradient of the magnetic field, which is amplified by the magnetic field device and read out by means of the crystal body.

The problem underlying the invention is further solved by a method for determining and/or monitoring a process variable of a medium in a container by means of a sensor device, wherein the sensor device comprises:

a crystal body with at least one defect, a magnetic field device for generating a magnetic field, the magnetic field device being arranged in such a way that a magnetic field can be generated by means of the magnetic field device in the region of the crystal body and in the region of the medium located inside the container and that a change in the magnetic field in the region of the crystal body is amplified, wherein the crystal body and the magnetic field device can be arranged from outside on a wall of the container, an excitation unit for optical excitation of the at least one defect, a detection unit for detecting a magnetic field-dependent fluorescence signal of the crystal body, an evaluation unit for determining at least one statement about the process variable on the basis of the fluorescence signal, wherein the method has at least the following method steps:

the generation of a magnetic field in the area of the crystal body and in the area of the medium inside the container, the stimulation of at least one defect, the detection of a fluorescence signal of the crystal body, the determination of a gradient of the magnetic field from the fluorescence signal, and the determination of a statement about the process variable based on the gradient of the magnetic field.

The gradient of the magnetic field is influenced by a change in the medium. For example, the magnetic permeability of the medium typically differs from the magnetic permeability of the air, so that at an interface between medium and air the magnetic field generated by the magnetic field device is distorted and thus the gradient of the magnetic field changes. This change in the gradient of the magnetic field is in turn detected and evaluated by means of the fluorescence signal of the defect. In the case of absence of medium in the area of the crystal body, a constant gradient of the magnetic field and a corresponding fluorescence signal is thus obtained. As soon as the medium enters the area of the crystal body and forms an interface with the air, a change in the gradient of the magnetic field is detected by means of the fluorescence signal and, for example, a limit level can be indicated. Instead of a limit level or a filling level, a chemical reaction or a mixture of media in the container can also be determined, for example.

According to the invention, no magnetic permeability of the medium is determined, but a change in the magnetic permeability in the area of the medium. This eliminates the need to specify limit values for, for example, the limit level of the medium in the container. The method according to the invention can be used for all types of media, regardless of the magnitude of their magnetic permeability.

In accordance with a further development, the gradient of the magnetic field is determined on the basis of at least two defects and/or at least two crystal bodies with at least one defect each, which are arranged linearly and perpendicularly to the bottom. The at least two defects and/or the at least two crystal bodies are arranged in such a way that a direction of the change in the gradient of the magnetic field can be determined. In this way, for example, in addition to the limit level, it can also be indicated whether the medium in the container continues to rise or fall. This also makes it possible to determine the filling level.

The invention is explained in greater detail with reference to the following drawings, FIG. 1-6. The following are shown:

FIG. 1: a simplified energy diagram for a negatively charged NV center in the diamond.

FIG. 2: a first embodiment of the sensor device according to the invention.

Figure 3:
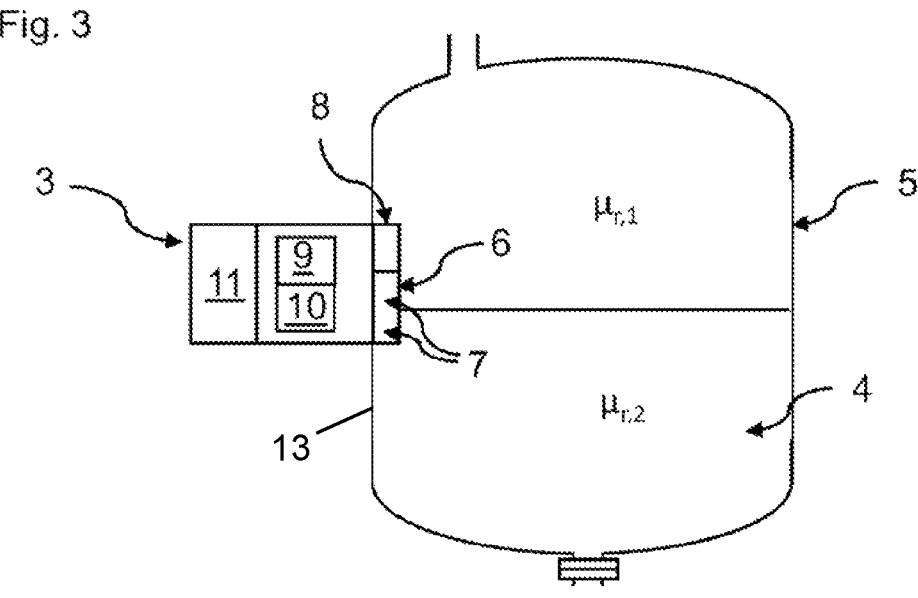

FIG. 3: a second embodiment of the sensor device according to the invention.

Figure 4:
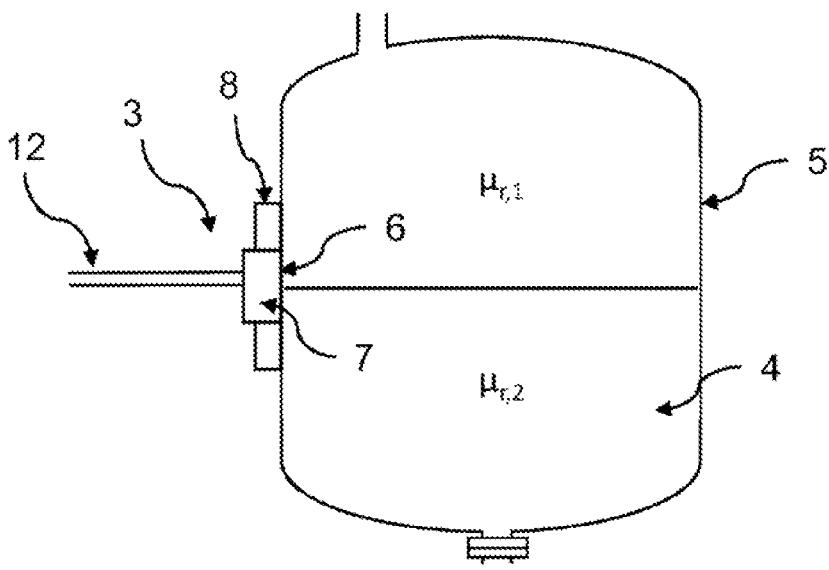

FIG. 4: a third embodiment of the sensor device according to the invention.

Figure 5:
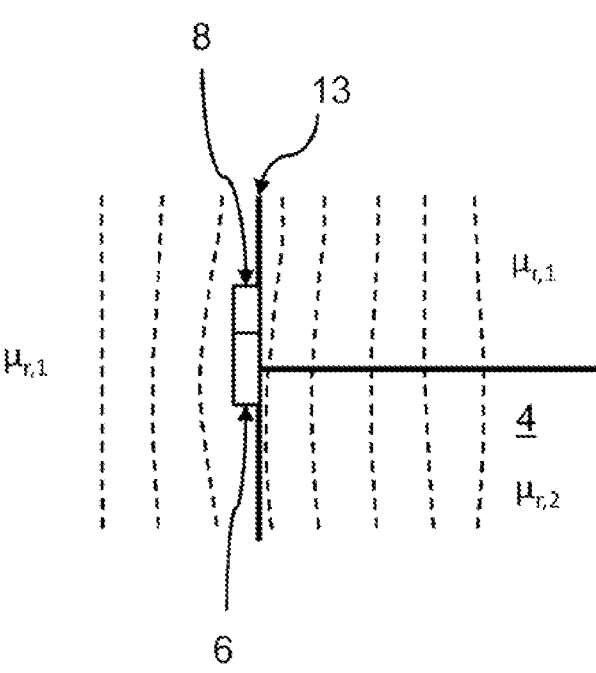

FIG. 5: a schematic representation of the change in the magnetic field at an interface between the medium and air.

Figure 6:
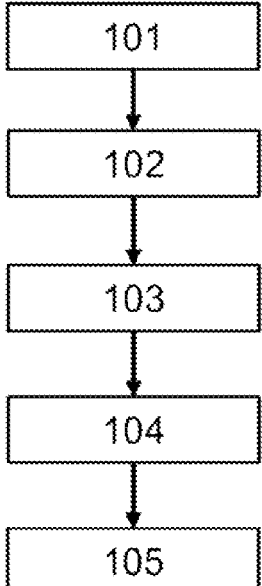

FIG. 6: a schematic diagram of the method according to the invention.

FIG. 1 shows a simplified energy diagram for a negatively charged NV center in a diamond to exemplify the excitation and fluorescence of a defect in a crystal body. The following considerations can be transferred to other crystal bodies having corresponding vacancies.

In the diamond, each carbon atom is typically covalently bonded to four further carbon atoms. A nitrogen vacancy center (NV center) consists of a vacancy in the diamond lattice, i.e., an unoccupied lattice site, and a nitrogen atom as one of the four neighboring atoms. In particular, the negatively charged $NV^-$ centers are important for the excitation and evaluation of fluorescence signals. In the energy diagram of a negatively charged NV center, there is a triplet ground state $^3A$ and an excited triplet state $^3E$, each of which has three magnetic substates $m_s = 0 \pm 1$. Furthermore, there are two metastable singlet states $^1A$ and $^1E$ between the ground state $^3A$ and the excited state $^3E$.

Excitation light 1 from the green range of the visible spectrum, e.g., an excitation light 1 with a wavelength of 532 nm, excites an electron from the ground state $^3A$ into a vibrational state of the excited state $^3E$, which returns to the ground state $^3A$ by emitting a fluorescence photon 2 with a wavelength of 630 nm. An applied magnetic field with a magnetic field strength B leads to a splitting (Zeeman splitting) of the magnetic sub-states, so that the ground state consists of three energetically separated sub-states, each of which can be excited. However, the intensity of the fluorescence signal is dependent on the respective magnetic substrate from which it was excited, so that the magnetic field strength B, for example, can be calculated using the Zeeman formula on the basis of the distance between fluorescence minima. In the context of the present invention, further possibilities for evaluating the fluorescence signal are provided, such as the evaluation of the intensity of the fluorescent light, which is likewise proportional to the applied magnetic field. An electrical evaluation can in turn be done, for example, via a Photocurrent Detection of Magnetic Resonance (PDMR). In addition to these examples for evaluating the fluorescence signal, there are other possibilities which also fall within the scope of the present invention.

FIG. 2 shows a first exemplary embodiment of the sensor device 3 according to the invention for determining and/or monitoring a process variable, for example a filling level or a limit level, of a medium in a container. The sensor device 3 is arranged from the outside on a wall 13 of the container 5, which is partially filled with a medium 4 to which a relative magnetic permeability $\mu_{r,2}$ is assigned. Above the medium there is usually air or a gas with the relative magnetic permeability $\mu_{r,1}$. The sensor device 3 comprises a crystal body 6 with a defect 7, an excitation unit 9 for exciting the defect 7, a detection unit 10 for detecting the fluorescence signal of the crystal body 6 and an evaluation unit 11 for determining at least one statement about the process variable on the basis of the fluorescence signal. The crystal body 6 can be, for example, a diamond with at least one nitrogen defect, silicon carbide with at least one silicon defect or hexagonal boron nitride with at least one defect color center.

Furthermore, a magnetic field device 8 is provided which generates a magnetic field in the area of the crystal body 6 and in the area of the medium 4 located inside the container 5, so that a change of the magnetic field in the area of the crystal body 6 is amplified. The magnetic field device 8 is, for example, a permanent magnet or a coil and may be arranged at least partially within the coil or between two end regions of the permanent magnet.

FIG. 2 shows a sensor device 3 which is arranged outside the container, i.e., non-invasively. As an alternative, FIG. 3 shows an invasive sensor device 3 which is flush with the wall 13 of the container 5. For example, the sensor device 3 is inserted into the wall 13 of the container by means of an adapter or a socket (not shown). The crystal body of FIG. 3 has, by way of example, two defects 7 which are arranged linearly and perpendicularly to the base on the wall 13 of the container 5. In this way, a direction of the change in the gradient of the magnetic field can be determined.

FIG. 4 shows a third exemplary embodiment of the sensor device 3, in which an optical fiber 12 is used to transmit the excitation signal from the excitation unit 9 to the crystal body 6 and to transmit the fluorescence signal of the crystal body 6 to the detection unit 10. In this example, the excitation unit 9, the detection unit 10 and the evaluation unit 11 are spatially separated from the crystal body 6.

In FIG. 5, the change of the magnetic field between the medium 4 with the relative magnetic permeability $\mu_{r,2}$ and the air with the relative magnetic permeability $\mu_{r,1}$ is shown schematically by means of the magnetic field lines which are drawn dashed. The sensor device 3 is attached to the wall 13 of the container 5. For simplicity, only the crystal body 6 and the magnetic field device 8 of the sensor device 3 are shown. Due to the difference in the magnetic permeability of the medium and the air, the otherwise parallel magnetic field lines are distorted in the area of the interface between the medium and the air. The magnetic field device 8 amplifies this distortion of the magnetic field lines in order to be able to read them subsequently by means of the fluorescence signal of the crystal body 6.

The method according to the invention is schematically depicted as a flow diagram in FIG. 6. In a first step 101, a magnetic field is generated in the area of the crystal body 6 and in the area of the medium 4. Subsequently, in a second step 102, the excitation of the at least one defect 7 takes place by means of the excitation unit 9, whereupon the crystal body 6 emits a fluorescence signal which is detected in the third step 103. On the basis of the detected fluorescence signal, the gradient of the magnetic field is determined in the fourth step 104 and finally, in the fifth step 105, a statement about the process variable is determined on the basis of the gradient of the magnetic field. The gradient of the magnetic field can be determined, for example, by means of at least two defects and/or at least two crystal bodies with at least one defect each, which are arranged linearly and perpendicular to the ground.

LIST OF REFERENCE SIGNS

1 Excitation light
2 Fluorescent light
3 Sensor device
4 Medium
5 Container
6 Crystal body
7 Defect
8 Magnetic field device
9 Excitation unit
10 Detection unit
11 Evaluation unit
12 Optical fiber
13 Wall

The invention claimed is:

1. A sensor device for determining and/or monitoring a process variable of a medium capable of filling a container to a plurality of different fill levels, the sensor device comprising:

a crystal body that includes at least two defects or at least two crystal bodies that each including at least one defect, wherein the at least two defects, or the at least two crystal bodies, are configured to be arranged linearly and perpendicular to ground on a wall of the container;

a magnetic field device configured to generate a magnetic field, wherein the magnetic field device is arranged to generate the magnetic field in a region of the crystal body, or of the at least two crystal bodies, and in a region of the medium within the container such that a change in the magnetic field in the region of the crystal body, or of the at least two crystal bodies, is amplified;

an excitation unit configured to generate an excitation signal to optically excite the at least two defects of the crystal body or of the at least two crystal bodies;

a detection unit configured to detect a magnetic field-dependent fluorescence signal emitted from the crystal body, or from the at least two crystal bodies, in a manner dependent upon the magnetic field; and an evaluation unit configured to determine at least one characteristic of the process variable of the medium based on the fluorescence signal, and wherein the process variable includes a fill level or a limit level of the medium, and the magnetic field in the region of the medium is dependent on a change to the fill level.

2. The sensor device according to claim 1, wherein the crystal body is:

diamond and the at least one defect is a nitrogen defect;

silicon carbide and the at least one defect is a silicon defect; or hexagonal boron nitride and the at least one defect is a defect color center.

3. The sensor device according to claim 1, wherein the magnetic field device includes a permanent magnet or a coil.

4. The sensor device according to claim 1, further comprising at least one optical fiber configured to conduct the excitation signal from the excitation unit to the crystal body and/or to conduct the fluorescence signal of the crystal body to the detection unit.

5. The sensor device according to claim 1, wherein the sensor device is configured to be arranged outside the container.

6. The sensor device according to claim 1, wherein the sensor device is configured to be mounted flush with the wall of the container such that at least a portion of the sensor device is disposed in the wall.

7. A method for determining and/or monitoring a process variable of a medium capable of filling a container to a plurality of different fill levels using a sensor device, wherein the sensor device comprises:

a crystal body that includes at least two defects or at least two crystal bodies that each including at least one defect, wherein the at least two defects, or the at least two crystal bodies, are configured to be arranged linearly and perpendicular to ground on a wall of the container;

a magnetic field device configured to generate a magnetic field, wherein the magnetic field device is arranged to generate the magnetic field in a region of the crystal body, or of the at least two crystal bodies, and in a region of the medium within the container such that a change in the magnetic field in the region of the crystal body, or of the at least two crystal bodies, is amplified;

an excitation unit configured to generate an excitation signal to optically excite the at least two defects of the crystal body or of the at least two crystal bodies;

a detection unit configured to detect a magnetic field-dependent fluorescence signal emitted from the crystal body, or from the at least two crystal bodies, in a manner dependent upon the magnetic field; and an evaluation unit configured to determine at least one characteristic of the process variable based on the fluorescence signal, wherein the method comprises:

generating the magnetic field in the region of the crystal body, or of the at least two crystal bodies, and in the region of the medium inside the container;

stimulating the at least two defects;

detecting the fluorescence signal emitted from the crystal body, or from the at least two crystal bodies;

determining a gradient of the magnetic field from the fluorescence signal, wherein the gradient of the magnetic field is determined based on the at least two defects, which are arranged linearly and perpendicular to ground; and determining the at least one characteristic of the process variable based on the gradient of the magnetic field, wherein the process variable includes a fill level or a limit level of the medium, and the magnetic field in the region of the medium is dependent on a change to the fill level.

* * * * *